E. J. CALLAHAN.
BRIQUET AND PROCESS OF MAKING THE SAME.
APPLICATION FILED FEB. 19, 1909.
979,258.
Patented Dec. 20, 1910.
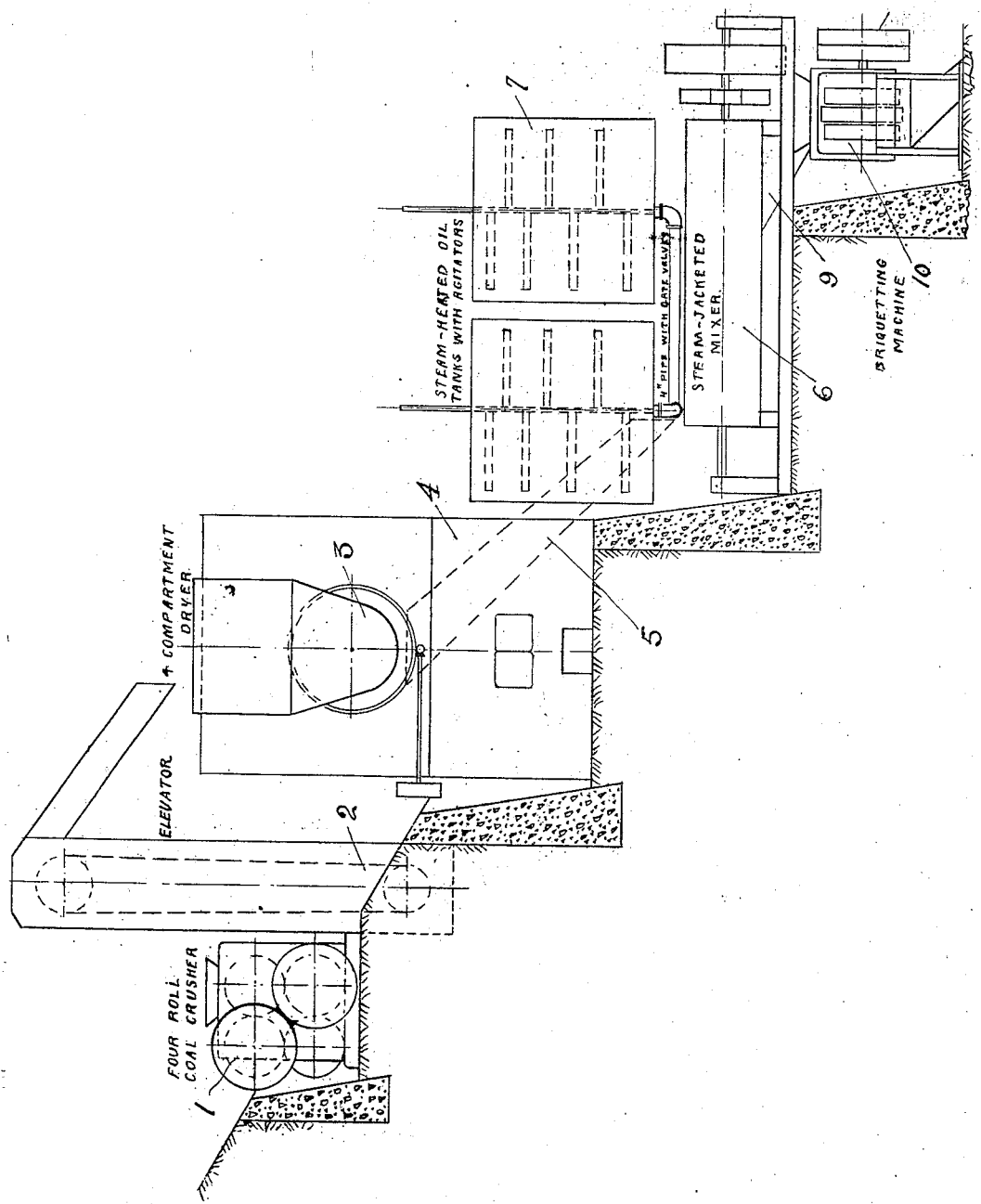

UNITED STATES PATENT OFFICE.

EDWARD J. CALLAHAN, OF SALT LAKE CITY, UTAH.

BRIQUET AND PROCESS OF MAKING THE SAME.

979,258.

Specification of Letters Patent. Patented Dec. 20, 1910.

Application filed February 19, 1909. Serial No. 478,906.

*To all whom it may concern:*

Be it known that I, EDWARD J. CALLAHAN, a citizen of the United States, residing at Salt Lake City, in the county of Salt Lake, State of Utah, have invented certain new and useful Improvements in Briquets and Processes of Making the Same, of which the following is a description, reference being had to the accompanying drawings, forming a part hereof.

My invention has for its object a process of making briquets out of coal dust by which whether the material used be anthracite or bituminous coal or even lignite, a briquet is produced which is not affected by exposure to the air or by moisture and will burn steadily and without falling to pieces, and my invention consists in the process hereinafter described and claimed, and in the product produced by the process.

The drawing represents diagrammatically an apparatus or plant suitable for carrying out my process, the drawing being illustrative merely.

In the drawing 1 is a crusher by which the coal, if not already in the form of dust, is reduced to a finely divided condition.

2 is an elevator or conveyer for carrying the powdered coal to the drier.

3 is the drier which may be of any convenient form but is preferably a rotary compartment drier heated by a furnace 4. The drier is so arranged and operated as to not only thoroughly dry the coal dust to eliminate all moisture but to heat it strongly, preferably as hot as it can be heated without causing combustion. From the drier the dried and heated coal dust is led by a chute 5 to a mixer 6 in which it is mixed with the solidifying composition as hereinafter described.

7 is the mixing kettle for the solidifying composition and is provided with stirrers 8 and is steam heated. Preferably two of these mixing kettles are used so that a constant supply of the mixture may be assured. From the mixing kettle a pipe with suitable controlling valves leads to the mixer 6.

The composition formed in the mixing kettle consists of mineral oil, rosin, a caustic alkali, preferably lye, and soap stock in the proportions preferably of 81¼ per cent. of mineral oil, and 6¼ per cent. each of the rosin, lye and soap stock. The mineral oil may be crude petroleum residue or other mineral oil product. The rosin used is preferably ordinary commercial rosin, the lye is preferably ordinary pulverized potassium hydroxid and the soap stock may be any kind of animal fat or grease. All of these ingredients should be free from water. The ingredients mentioned are boiled in the mixing kettle 6 for from three to thirty minutes or even longer and are preferably stirred during cooking operation. When the composition becomes stringy it is sufficiently cooked but the cooking may be continued longer without injury. The boiling of the composition eliminates any moisture which may be present and by the action of the lye and rosin on the soap stock and the mineral oil produces a composition which becomes solid on cooling. When the composition has been sufficiently cooked it is allowed to pass into the mixer 6, together with heated coal dust from the drier 3, the proportions being preferably 8 parts of the composition to 92 parts of the coal dust.

The mixer 6 is steam jacketed or otherwise heated and is kept hot during the mixing. A small quantity of soot is preferably added either to the composition before it is drawn from the mixing tank or to the coal dust as it enters the mixer. The soot is used for the purpose of increasing the resistance of the finished briquet to water. It is used preferably in the proportion of about 1 part soot to 99 parts of the composition but a slightly greater or smaller proportion may be used with good results.

From the mixer the coal dust having the above described composition thoroughly incorporated with it, and still highly heated is led by a short chute 9 to a briqueting machine 10 by which it is compressed under suitable pressure into briquets of any desired shape or size. As the briquets leave the briqueting machine they are cooled by exposure to the air and become solid and very hard. From the briqueting machine the briquets are carried by a conveyer or elevator 11 to a storage bin 12.

It is essential to the process that the composition used shall be liquid only when hot and capable of solidifying on cooling and shall be free from water, and that the coal dust shall be free from water and hot, and that nothing be added to the mixture which will absorb moisture. The coal dust may be slack coal or culm which is of so little value as not to pay for transportation or may be formed by crushing anthracite, bituminous coal or lignite. The briquets formed by the described process even when made from anthracite or lignite coke readily and burn without forming clinker. They are hard and do not disintegrate from exposure to the atmosphere and will not absorb water.

It should be understood that the proportions of the ingredients of the solidifying compound and the relative proportions of the compound and the coal dust above stated are the proportions which I have found most desirable but I do not desire to be limited to the precise proportions specified as they may be varied considerably. After the first batch of the solidifying compound has been cooked and drawn off for use good results may be secured by adding mineral oil, lye and rosin without the soap stock, so long at least as some of the previously cooked compound remains in the tank. Briquets made without soot are satisfactory for fuel purposes but do not resist moisture well. With the use of soot they resist moisture completely.

Having thus described my invention, what I claim and desire to secure by Letters Patent is:

1. The process of producing briquets from coal dust, which consists in heating the coal dust, adding to it while hot a hot liquid compound containing mineral oil and a substance which forms with said oil a compound capable of solidifying on cooling, and forming the mixture into briquets while hot.

2. The process of producing briquets from coal dust, which consists in heating the coal dust, adding to it while hot a hot liquid compound containing mineral oil and a substance which forms with said oil a compound capable of solidifying on cooling, adding soot to the mixture, and forming the mixture into briquets while hot.

3. The process of producing briquets from coal dust, which consists in heating the coal dust, forming a solidifying compound of mineral oil, resin, caustic alkali, and soap stock and boiling the compound, mixing the heated coal dust with the hot compound, and forming the mixture into briquets while hot.

4. The process of producing briquets from coal dust, which consists in heating the coal dust, forming a solidifying compound of mineral oil, resin, caustic alkali, and soap stock and boiling the compound, adding soot, mixing the heated coal dust with the hot compound, and forming the mixture into briquets while hot.

5. A briquet composed of coal dust from which moisture has been eliminated and a solidifying compound composed of mineral oil, rosin, lye, and soap stock boiled together.

6. A briquet composed of coal dust from which moisture has been eliminated, soot, and a solidifying compound composed of mineral oil, rosin, lye and soap stock boiled together.

7. A briquet composed of coal dust from which moisture has been eliminated, substantially 92 parts, and substantially 8 parts of a solidifying compound composed of mineral oil, rosin, lye and soap stock boiled together.

8. A briquet composed of coal dust from which moisture has been eliminated, substantially 92 parts, substantially 8 parts of a solidifying compound composed of mineral oil, rosin, lye, and soap stock an about one part of soot.

This specification signed and witnessed this 8th day of February A. D. 1909.

EDWARD J. CALLAHAN.

In the presence of—
CHAS. E. RIORDON,
A. P. GREELEY.